United States Patent
Soneda

(10) Patent No.: US 8,254,353 B2
(45) Date of Patent: Aug. 28, 2012

(54) WIRELESS COMMUNICATION APPARATUS, LOAD DISPERSING METHOD THEREOF, LOAD DISPERSING PROGRAM THEREOF, AND WIRELESS COMMUNICATION SYSTEM

(75) Inventor: Takeshi Soneda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1240 days.

(21) Appl. No.: 11/831,020

(22) Filed: Jul. 31, 2007

(65) Prior Publication Data

US 2008/0075053 A1 Mar. 27, 2008

(30) Foreign Application Priority Data

Sep. 22, 2006 (JP) ................................. 2006-257399

(51) Int. Cl.
*H04W 4/00* (2009.01)
(52) U.S. Cl. ....................................................... 370/338
(58) Field of Classification Search .................. 370/338, 370/346, 329, 341, 344, 392, 345, 347, 348, 370/349, 350, 351, 352, 354, 389, 328, 310.2, 370/331, 310; 455/426.1, 426, 422.1, 567, 455/554.1, 554.2
See application file for complete search history.

(56) References Cited

U.S. PATENT DOCUMENTS

| 5,982,765 | A  | * | 11/1999 | Shimada .................... 370/347 |
| 6,256,334 | B1 |   | 7/2001  | Adachi |
| 7,358,899 | B1 | * | 4/2008  | Ville et al. .................. 342/458 |
| 7,450,546 | B2 | * | 11/2008 | Lee et al. .................... 370/331 |
| 7,590,100 | B2 | * | 9/2009  | Smith et al. ................ 370/346 |

FOREIGN PATENT DOCUMENTS

| JP | 10-261980    | 9/1998 |
| JP | 11-126185    | 5/1999 |
| JP | 2004-221684  | 8/2004 |
| JP | 2006-101540  | 4/2006 |

* cited by examiner

*Primary Examiner* — Chi Pham
*Assistant Examiner* — Alexander O Boakye
(74) *Attorney, Agent, or Firm* — Fujitsu Patent Center

(57) ABSTRACT

With respect to wireless communication apparatuses to which a plurality of clients are connected by wireless, uneven distribution of load is prevented, without monitoring the situation of the uneven distribution of the load among wireless communication apparatuses. The wireless communication apparatuses (access points) connected by wireless to the plurality of clients have a responding unit (wireless LAN unit and CPU) that responds to a connection request from a client at different response timing depending on the number of clients connected. Since the responding unit responds at different response timing depending on the number of clients connected and the wireless communication apparatus that has a small number of clients responds quickly, dispersion of the load can be achieved.

17 Claims, 13 Drawing Sheets

WIRELESS COMMUNICATION APPARATUS, LOAD DISPERSING METHOD THEREOF, LOAD DISPERSING PROGRAM THEREOF, AND WIRELESS COMMUNICATION SYSTEM

CROSS-REFERENCE TO RELATED APPLICATIONS

This application is based upon and claims the benefit of priority from the prior Japanese Patent Application No. 2006-257399, filed on Sep. 22, 2006, the entire contents of which are incorporated herein by reference.

BACKGROUND OF THE INVENTION

1. Field of the Invention

The present invention relates generally to dispersion of load among a plurality of wireless LAN (Local Area Network) access points to which a plurality of clients (such as terminal devices) are connected, and more particularly, to a wireless communication apparatus, a load dispersing method thereof, a load dispersing program thereof, and a wireless communication system, which are prevented from uneven distribution of load among the wireless LAN access points, for example, uneven distribution of the number of clients.

2. Description of the Related Art

In a wireless LAN system having a plurality of access points, a plurality of clients are connected by wireless to each access point. If connection of a client to each access point is left to the freedom of the two parties, uneven distribution will occur in the number of clients connected to respective access points.

With respect to prevention of such uneven distribution of load among access points, Japanese Patent Application Laid-Open Publication No. 2004-221684 discloses that, based on a connection request from a terminal device, a verifying device determines loading condition of access points and, based on such determination, instructs the client to try to connect with other access point rather than the access point the connection to which is requested as a method of dispersing the load among the access points. Japanese Patent Application Laid-Open Publication No. 1999-126185 discloses that in response to the connection request from a client, the client is assigned to a communication process which has the least number of connections. Japanese Patent Application Laid-Open Publication No. 2006-101540 discloses that upon receipt of a probe signal from a terminal device, judgment is made of the loading condition of base station devices and, based on the judgment, a base station device is selected.

Incidentally, the dispersion of load among access points without involvement of information exchange among access points may simply be realized by so arranging that the number of clients that can be connected to each access point is limited and that when such limited number is exceeded for an access point, clients will flow to other access points. Specifically, the number of client connections that each access point accommodates is registered and any connection request in excess of such number of client connections is not accepted, namely, each access point may be equipped with a function of rejecting, ignoring, etc. In this case, since it is expected that with respect to the client whose connection request was rejected by an access point, other access point will accept the connection request, dispersion of load can simply be achieved. Namely, simple load dispersion can be achieved because of no need for such monitor of the number of connections or such judgment of loading condition as disclosed in Japanese Patent Application Laid-Open Publication No. 2004-221684, Japanese Patent Application Laid-Open Publication No. 1999-126185, or Japanese Patent Application Laid-Open Publication No. 2006-101540.

However, when an upper limit is set to the number of connections for the access points AP#1 and AP#2, as shown in FIG. 13, the number of connections of clients CL satisfies the upper-limit number of connections "10" at the specific access point AP#1, while it is inevitable that no connection is made or an extremely low number of connections are made with the other access point AP#2, and still the uneven distribution of load among the access points can not be prevented.

With respect to the problem that the optimization of load can not be achieved even if the upper limit is set to the number of connections for the access points as seen above, Japanese Patent Application Laid-Open Publication No. 2004-221684, Japanese Patent Application Laid-Open Publication No. 1999-126185, and Japanese Patent Application Laid-Open Publication No. 2006-101540 do not contain the disclosure or suggestion thereof or the disclosure or suggestion of the solution thereof. A problem of complication of a communication system is caused by the introduction of a management system equipped with a device for monitoring the number of connections or judging the loading condition as described in Japanese Patent Application Laid-Open Publication No. 2004-221684, Japanese Patent Application Laid-Open Publication No. 1999-126185, and Japanese Patent Application Laid-Open Publication No. 2006-101540.

SUMMARY OF THE INVENTION

An object of the present invention is to prevent uneven distribution of load among wireless communication apparatuses without monitoring the situation of uneven distribution of load with respect to the wireless communication apparatuses to which a plurality of clients are connected by wireless.

Another object of the present invention is to realize efficient dispersion of load within the limit of the number of connections with respect to the wireless communication apparatuses to which a plurality of clients are connected by wireless.

To achieve the above objects, the present invention is designed so that, with respect to wireless communication apparatuses to which a plurality of clients are connected by wireless, the wireless communication apparatuses respond to a connection request from a client at different timing depending on the number of clients connected thereto so that a wireless communication apparatus having a small number of clients responds quickly and the client comes to be connected to such wireless communication apparatus. This enables prevention of uneven distribution of the number of clients among the wireless communication apparatuses and achievement of dispersion of load.

In order to attain the above objects, according to a first aspect of the present invention there is provided a wireless communication apparatus connected by wireless to a plurality of clients, comprising a responding unit that responds to a connection request from a client at different response timing depending on the number of clients connected thereto.

To attain the above objects, in the wireless communication apparatus, the response timing may be after the number of times of the connection request from the client or after a time of duration corresponding to such number of times. The responding unit may generate a response time of duration corresponding to the number of clients connected and respond after such a response time. The responding unit may ignore the connection request from the client by the number of times equal to the number of clients connected and send out a response to accept the connection request in case that the number of times of the connection request from the client has exceeded the number of clients connected. The client may be a terminal device connected to the wireless communication apparatus.

To attain the above objects, according to a second aspect of the present invention there is provided a load dispersing method of a wireless communication apparatus connected by wireless to a plurality of clients, comprising the steps of receiving a connection request from a client; and responding to the connection request at different response timing depending on the number of clients connected.

To attain the above objects, in the load dispersing method of a wireless communication apparatus, the response timing may be after the number of times of the connection request from the client or after a time of duration corresponding to such number of times. The load dispersing method of a wireless communication apparatus may further comprise a step of ignoring the connection request from the client by the number of times equal to the number of clients connected and sending out a response to accept the connection request in case that the number of times of the connection request from the client has exceeded the number of clients connected.

To attain the above objects, according to a third aspect of the present invention there is provided a load dispersing program to be executed by a computer for dispersing the load of wireless communication apparatuses to which a plurality of clients are connected by wireless, the program comprising the steps of receiving a connection request from a client; and responding to the connection request at different response timing depending on the number of clients connected.

To attain the above objects, in the load dispersing program of wireless communication apparatuses, the response timing may be after the number of times of the connection request from the client or after a time of duration corresponding to such number of times. The load dispersing program of wireless communication apparatuses may further comprise the step of ignoring the connection request from the client by the number of times equal to the number of clients connected and sending out a response to accept the connection request in case that the number of times of the connection request from the client has exceeded the number of clients connected.

To attain the above objects, according to a fourth aspect of the present invention there is provided a wireless communication system including a wireless communication apparatus connected by wireless to a plurality of clients, wherein the wireless communication apparatus receives a connection request sent out from a client, the wireless communication apparatus comprising a responding unit that responds to the connection request at different response timing depending on the number of clients connected thereto.

To attain the above objects, in the wireless communication system, the response timing may be after the number of times of the connection request from the client or after a time of duration corresponding to such number of times. The responding unit may generate a response time of duration corresponding to the number of clients connected and respond after such a response time. The responding unit may ignore the connection request from the client by the number of times equal to the number of clients connected and send out a response to accept the connection request in case that the number of times of the connection request from the client has exceeded the number of clients connected. The client may be a terminal device connected to the wireless communication apparatus. The wireless communication apparatus may be an access point to which the client is connected by wireless.

To attain the above objects, according to a fifth aspect of the present invention there is provided a computer-readable recording medium having thereon stored a load dispersing program to be executed by a computer for dispersing the load of wireless communication apparatuses to which a plurality of clients are connected by wireless, the program comprising the steps of receiving a connection request from a client; and responding to the connection request at different response timing depending on the number of clients connected.

To attain the above objects, in the computer-readable recording medium having thereon stored a load dispersing program of a wireless communication apparatus, the response timing may be after the number of times of the connection request from the client or after a time of duration corresponding to such number of times. The program may further comprise the step of ignoring the connection request from the client by the number of times equal to the number of clients connected and sending out a response to accept the connection request in case that the number of times of the connection request from the client has exceeded the number of clients connected.

Features and advantages of the present invention are enumerated as follows:

(1) Since, to a connection request from a client, wireless communication apparatuses respond at response timing depending on the number of clients connected thereto, the client can be connected to the wireless communication apparatus to which a small number of clients are connected, uneven distribution of clients among the wireless communication apparatuses can be prevented, and dispersion of load among the wireless communication apparatuses can be achieved.

(2) The number of clients connected to the wireless communication apparatuses is not controlled, a controlling device for such purpose is not required and the load dispersion can be made between the wireless communication apparatuses and the clients.

(3) It is not necessary to add a facility or function for the dispersion of load to clients.

Other objects, features, and advantages of the present invention will become more apparent by referring to accompanying drawings and each embodiment.

DETAILED DESCRIPTION OF THE PREFERRED EMBODIMENTS

First Embodiment

Figure 1:
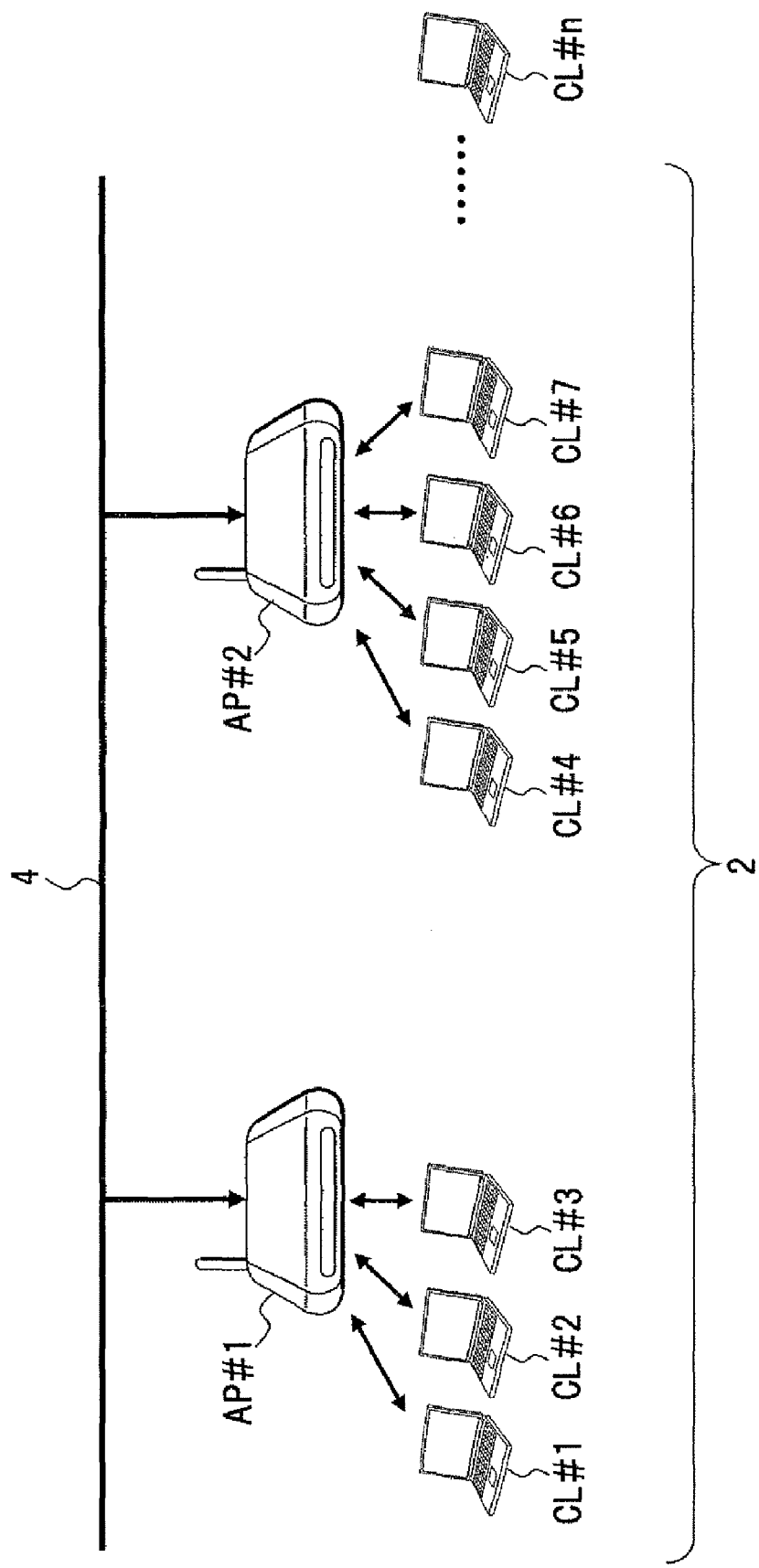
FIG. 1 is a diagram of a configuration example of a wireless LAN system according to a first embodiment.

Description will now be made of a first embodiment of the present invention, with reference to FIG. 1. FIG. 1 is a diagram of a wireless LAN system according to the first embodiment.

This wireless LAN system 2 is an example of a wireless communication system in which a plurality of terminal devices (clients) are connected by wireless. This wireless LAN system 2 is provided with access points AP#1 and AP#2 as a plurality of wireless communication apparatuses. These access points AP#1 and AP#2 are connected to a bus 4 and are connected to a network by way of a router which is not illustrated in FIG. 1 and are in a relationship of sharing information. These access points AP#1 and AP#2 receive a connection request from clients CL#1, CL#2, . . . CL#n and are capable of connecting by wireless within a predetermined number of connections and serve as base stations to clients CL#1, CL#2, . . . CL#n. The clients CL#1, CL#2, . . . CL#n are composed of information processing terminal devices such as personal computers equipped with a wireless connection function.

In this wireless LAN system 2, in the case of FIG. 1, clients CL#1, CL#2, and CL#3 are connected to the access point AP#1 and clients CL#4, CL#5, CL#6, and CL#7 are connected to the access point AP#2. It is assumed that the maximum number of connections (upper limit) M of the number of connections C of clients CL#1, CL#2, . . . C#n to the access points AP#1 and AP#2 is given, for example, as M=10. Then, at the access point AP#1, with C=3, if the number of allowable connections is given as Cx, further connections of Cx=M−3=7 can be made to the access point, and at the access point AP#2, with C=4, further connections of Cx=M−4=6 can be made to the access point.

Figure 2:
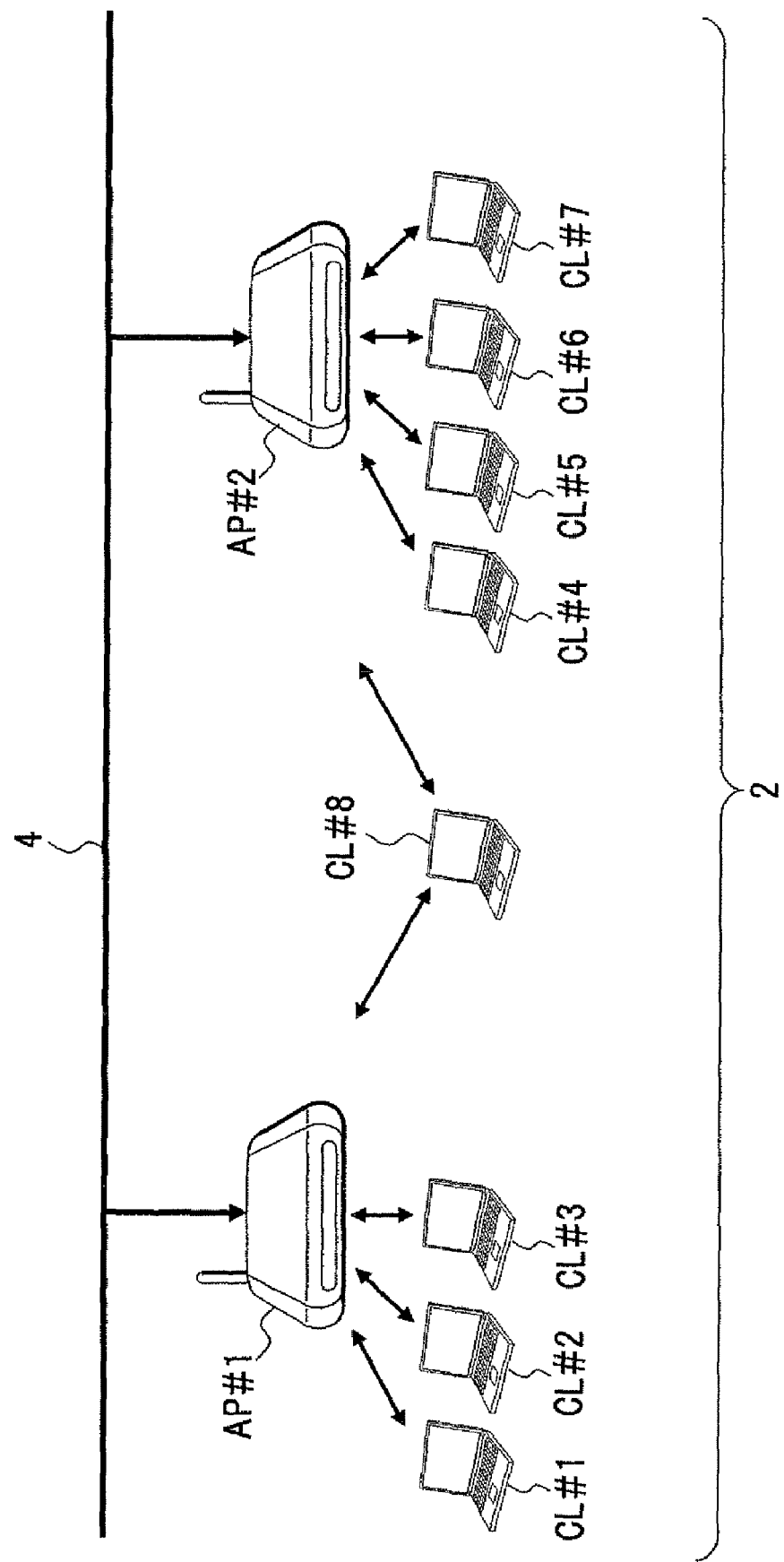
FIG. 2 is a diagram of a connection request from a new client to access points in the wireless LAN system.
Figure 3:
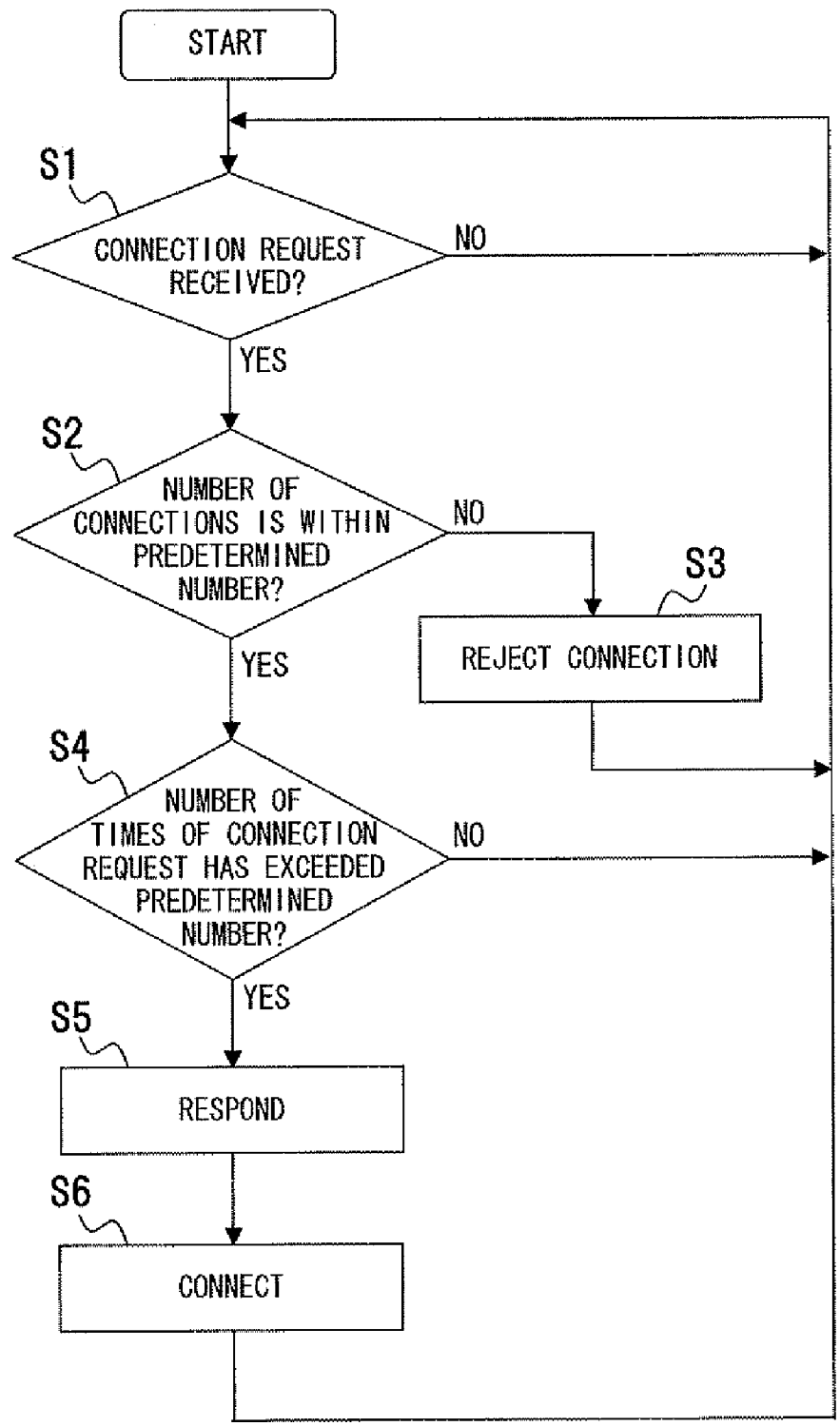
FIG. 3 is a flow chart of an example of a processing procedure of a load dispersing method of wireless communication apparatuses.

Description will then be made of a method of dispersing the load of the wireless communication apparatuses, with reference to FIGS. 2 and 3. FIG. 2 illustrates the case wherein a connection request is sent from the client CL#8 to the access points AP#1 and AP#2 in the wireless LAN system 2 (FIG. 1) and FIG. 3 is a flow chart of an example of processing procedure of the load dispersing method of the access points AP#1 and AP#2. In FIG. 2, the same parts as in FIG. 1 are given the same reference numerals.

In this case, both of the access points AP#1 and AP#2 are in operational state and the connection request is sent from the client CL#8 to the access points AP#1 and AP#2. The client CL#8 sends the connection request repeatedly at predetermined time intervals.

The processing procedure of the load dispersing method comprises the following processing:

a) processing of accepting the connection request;

b) monitoring (counting and storing thereof) of the number of times of the connection request from each client;

c) monitoring of the number of clients;

d) response timing depending on the number of clients (generation of response time);

e) response and connection; etc.

Description will then be made of these kinds of processing based on specific steps.

Each of the access points AP#1 and AP#2, upon receipt of the connection request sent by the client CL#8, judges whether it is a connection request (step S1) and, based on the connection request, judges whether the current number of clients Cn has reached the maximum number of connections M that is the limit of the number of connections (step S2) and rejects the connection if Cn=M (step S3) and allows the connection if Cn<M.

In this case, each of the access points AP#1 and AP#2 counts the number of times N of the connection request sent by the client CL#8, compares the number of times N with the current number of connections Cn, and judges whether the number of times N has exceeded the current number of connections Cn (step S4). If the number of times N of the connection request does not exceed the current number of connections Cn, then each of the access points AP#1 and AP#2 continues to count the number of times N of the connection request.

If the number of times N of the connection request has exceeded the current number of connections Cn, the access point AP#1 makes a connection response to the client CL#8 from which the connection request was sent (step S5). If, to this connection response, the connecting conditions are met, connection is made between the client CL#8 and the access point AP#1 (step S6).

As seen above, while each of the access points AP#1 and AP#2 counts the number of times of the connection request sent from the client CL#8, the counting is continued until the number of times N of the connection request exceeds the current number of clients Cn at each of the access points AP#1 and AP#2, and the access points AP#1 and AP#2 make a response at different response timing depending on the number of clients currently connected thereto. With respect to this response timing, if the counted number of times of the connection request is taken as time information and the time from the connection request to the response is taken as a response time T, this response time T will have different duration depending on the number of clients connected.

Here, when the connection request is repeatedly sent from the client CL#8 to AP#1 and AP#2, each of the access points AP#1 and AP#2 counts the number of times of the connection request, and at the point in time when the number of times has exceeded the number of clients connected, the connection response is sent from the access point AP at which the number of clients has been exceeded. In this case, since the number of clients connected Cn at the access point AP#1 is Cn=3 and the number of clients connected Cn at the access point AP#2 is Cn=4, when the fourth connection request is sent from the client CL#8, the access point AP#1 answers thereto by making a connection response and if the connecting conditions are met, connection is made between the access point AP#1 and the client CL#8.

In terms of the response time T, the response time T#1 at the access point AP#1 is a time of duration until the connection response is sent in correspondence to the number of times of the connection request N=4 or a time corresponding to the number of times of the connection request N=4. After the sending of the connection response from the access point AP#1, the client CL#8 is not required to send the connection request, but if the response time T#2 at the access point AP#2 is to be hypothetically defined, since Cn=4 at the access point AP#2, the response time T#2 is a time of duration until the connection response is sent in correspondence to the number of times of the connection request N=5 or a time corresponding to the number of times of the connection request N=5, hence T#1<T#2. Namely, in the relationship between the connection request and the response, a shorter response time T proportional to the number of connections is generated at the access point AP#1 that has a lower number of clients. If there are three or more access points APs, the connection response is generated from the access point AP that has the least number of clients.

According to the processing procedure as seen above, the client is connected to the access point that has a smallest number of clients connected and the dispersion of load among the access points can be achieved. At the same time, the client can know, from the connection made, the access point that has a smallest number of connections. Furthermore, no overall control device is required on the part of the access points and the dispersion of load among the access points can be achieved by access points alone. No special equipment is required on the part of the clients and the clients are required only to have a function of periodically issuing the connection request for making connection.

Second Embodiment

Figure 4:
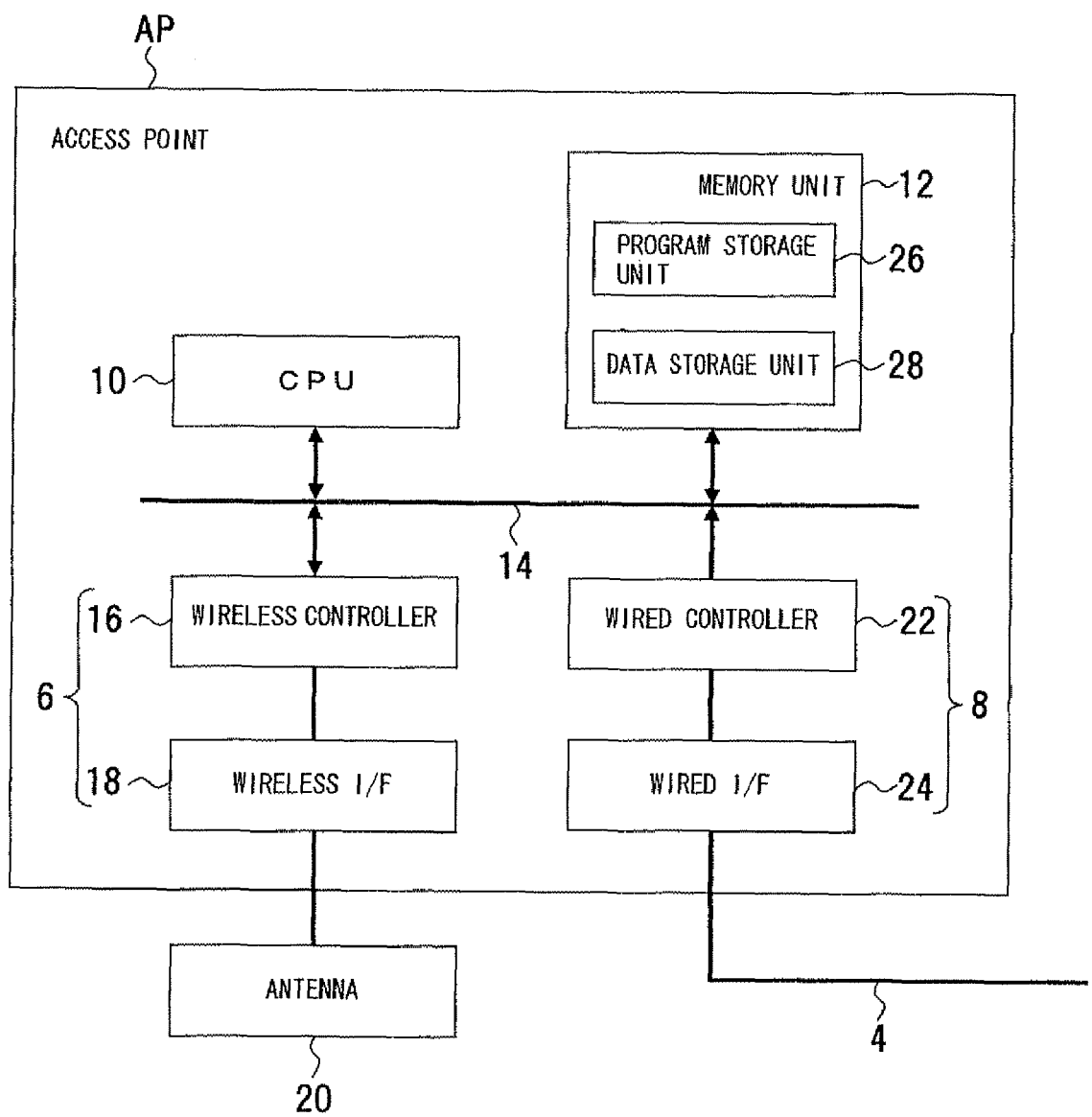
FIG. 4 is a diagram of a configuration example of the access point in a wireless communication system according to a second embodiment.
Figure 5:
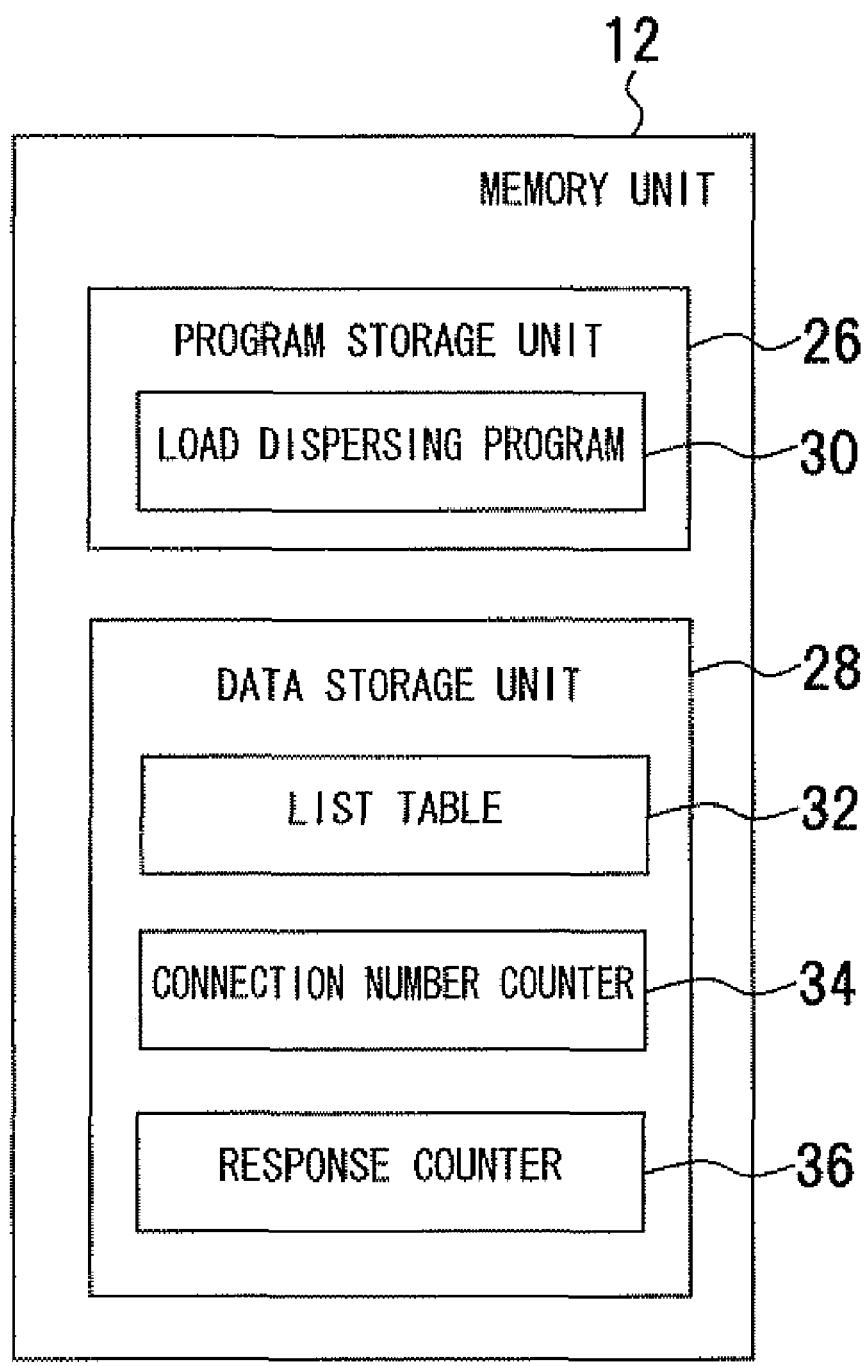
FIG. 5 is a diagram of a configuration example of a memory unit of the access point.
Figure 6:
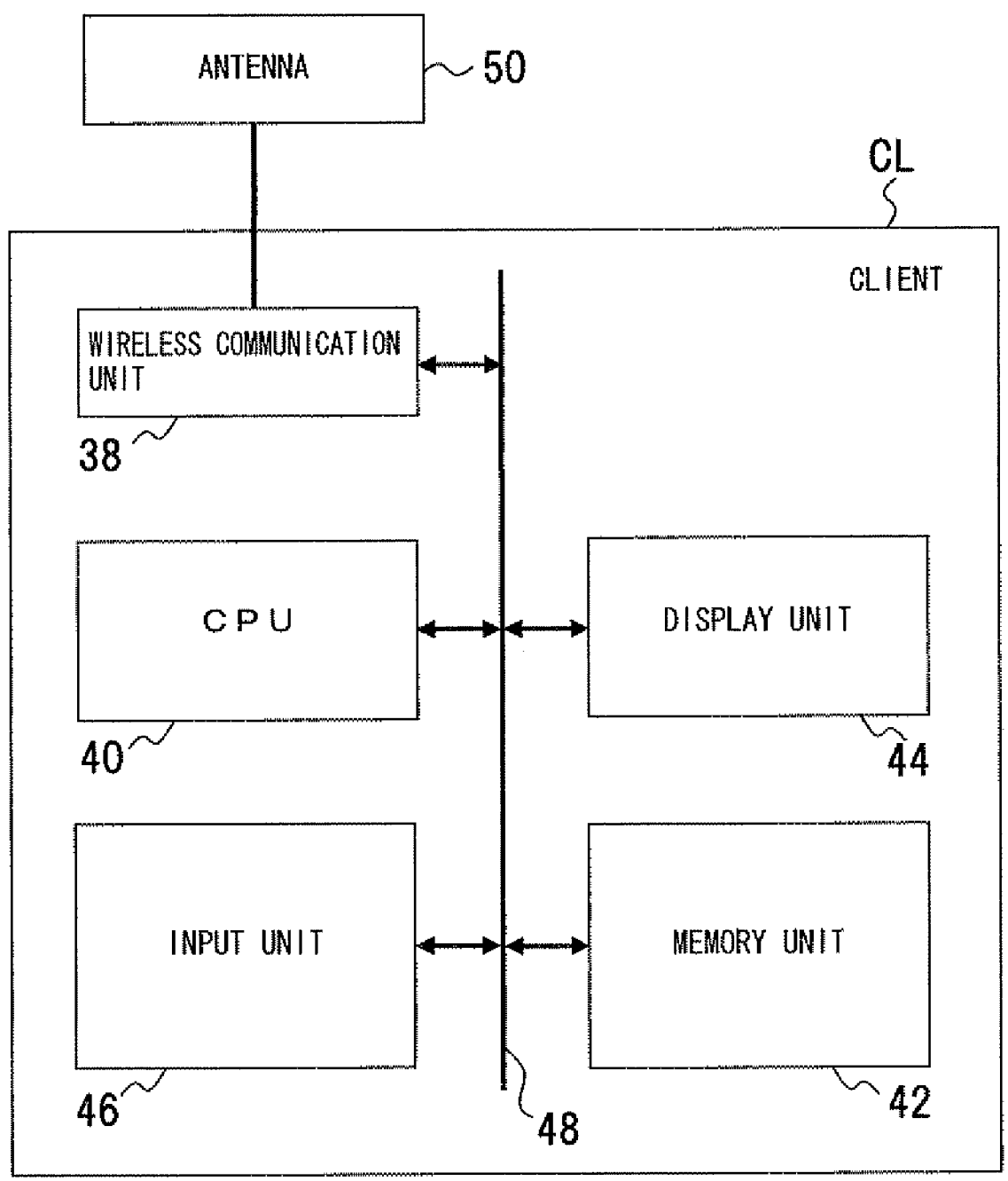
FIG. 6 is a diagram of a configuration example of the client.

Description will now be made of a second embodiment of the present invention, with reference to FIGS. 4 to 6. FIG. 4 is a diagram of a configuration example of the access point, FIG. 5 is a diagram of a configuration example of a memory unit of the access point, and FIG. 6 is a diagram of a configuration example of the client. In FIGS. 4 to 6, the same parts as in FIG. 1 and 2 are given the same reference numerals.

In this embodiment as well, the wireless LAN system 2 described above is used. In this wireless LAN system 2, the access point AP is an example of the wireless communication apparatus and, as shown in FIG. 4, comprises a wireless LAN unit 6 as a wireless communication unit, a wired LAN unit 8 as a wire communication unit, a CPU (Central Processing Unit) 10 as a control unit, and a memory unit 12 and these units are connected by a bus 14. The wireless LAN unit 6 is controlled by the CPU 10 and has a function as a responding unit that executes processing such as generating, to the connection request from a client, a response of different response timing depending on the number of times of the connection request.

The wireless LAN unit 6 is connected by wireless to the clients CL#1, CL#2, . . . CL#n described above under control of the CPU 10 and comprises a wireless controller 16 and a wireless interface unit (I/F) 18. The wireless interface unit 18 is connected to an antenna 20. The wireless controller 16, under control of the CPU 10, controls the wireless interface unit 18, The wireless interface unit 18, comprising a transmitting unit and a receiving unit, transmits and receives an electromagnetic wave of the frequency used by the wireless LAN through the antenna 20 and executes wireless connection to the clients CL#1, CL#2, . . . CL#n and data communication through the wireless connection.

The wired LAN unit 8, comprising a wired controller 22 and a wired interface unit (I/F) 24, is controlled by the CPU 10 and performs data communication with other access points APs connected thereto. The wired controller 22, under control of the CPU 10, controls the wired interface unit 24. The wired interface unit 24, comprising a transmitting unit and a receiving unit, is wired-connected to other access points APs through a bus 4 and performs data communication with such access points APs.

The CPU 10 is a control unit of respective functional units and, by execution of a load dispersing program stored in the memory unit 12, executes load dispersing processing, connecting processing, disconnecting processing, etc., as various kinds of processing for realizing the load dispersing method described above.

The memory unit 12 is a recording medium for storing the load dispersing program, the connection request, the number of times thereof, the number of clients connected, etc., and comprises a program storage unit 26 and a data storage unit 28, for storing various kinds of program and data. As shown in FIG. 5, the program storage unit 26 stores the load dispersing program 30, etc., and the data storage unit 28 contains a list table 32 for storing a connection request list, a connection number counter 34 in which the counted number of clients CLs and the maximum number of connections as an upper limit of the number of clients CLs are set, a response counter 36 storing the response for each client CL, etc.

In such configuration, with the CPU 10 executing the processing of changing the response depending on the number of connections and with the memory unit 12 performing the function of temporarily storing packets and the counting function of the connection number counter 34, connection rejection or connection is made and the data communication is made between the access point and the client CL connected.

While a "Probe Request" as the connection request is sent from the client CL and a "Probe Response" as the connection response is sent from the access point AP, the timing of transmission thereof is changed depending on the number of connections of the clients CLs. In this embodiment, the number of the connection requests "Probe Requests" to be ignored or rejected is determined by the number of connections of the clients CLs.

As shown in FIG. 6, the client CL comprises a wireless communication unit 38, a CPU 40 as a control unit, a memory unit 42, a display unit 44, and an input unit 46 and these units are connected by way of a bus 48. The wireless communication unit 38, comprising a transmitting unit and a receiving unit that perform the data communication at the frequency used by the wireless LAN through the antenna 50, transmits the connection request at predetermined timing to the access point AP and receives the response from the access point AP. The CPU 40, by execution of a program stored in the memory unit 42, controls various functional units such as the wireless communication unit 38 and executes the generation of the connection request and connecting processing based on the response. The display unit 44 is used for display of various states such as the communication state and display of input and output information. The input unit 46 is used for inputting, etc., of various kinds of data as object of data communication.

Figure 7:
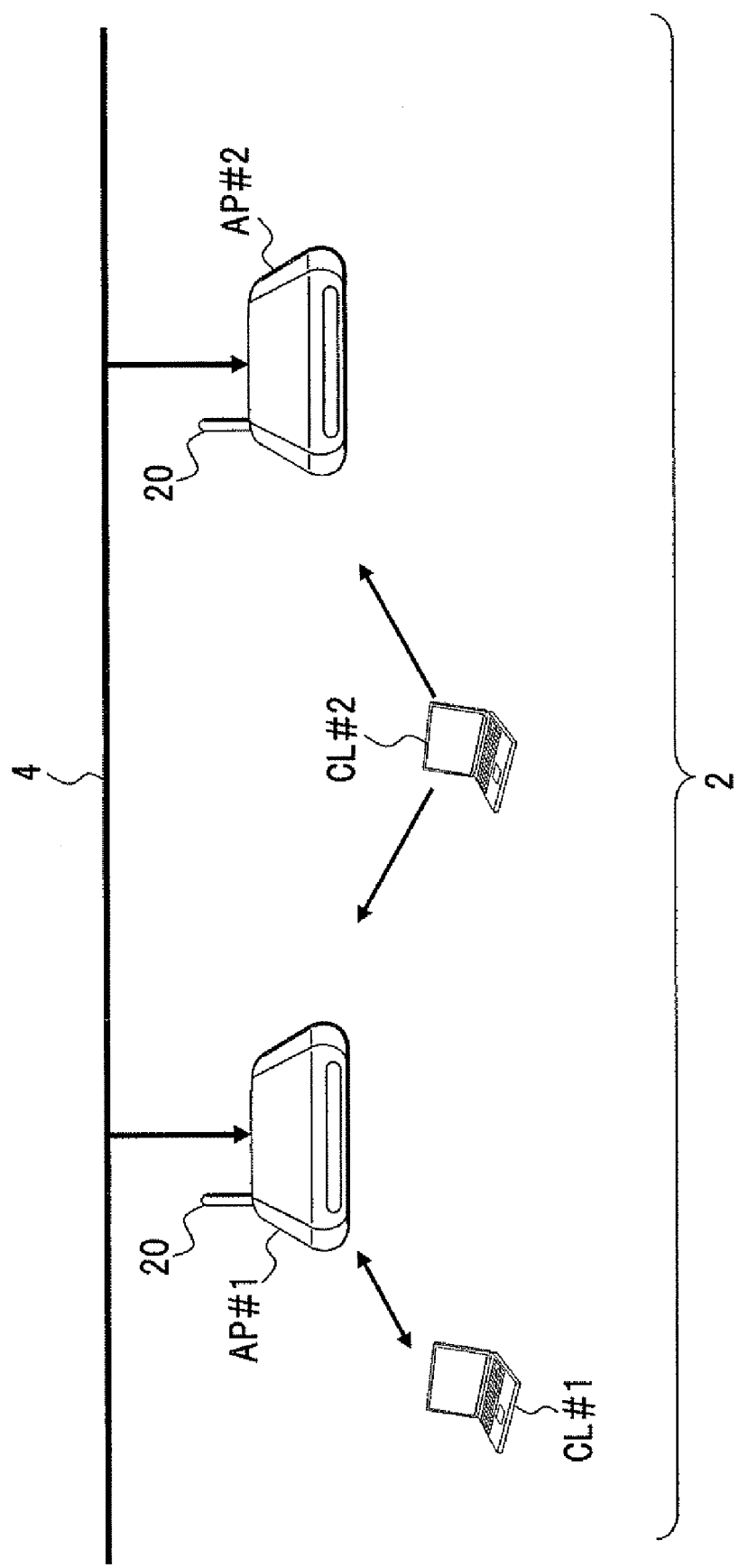
FIG. 7 is a diagram of the connection request from the client to the access points having different loads.
Figure 8:
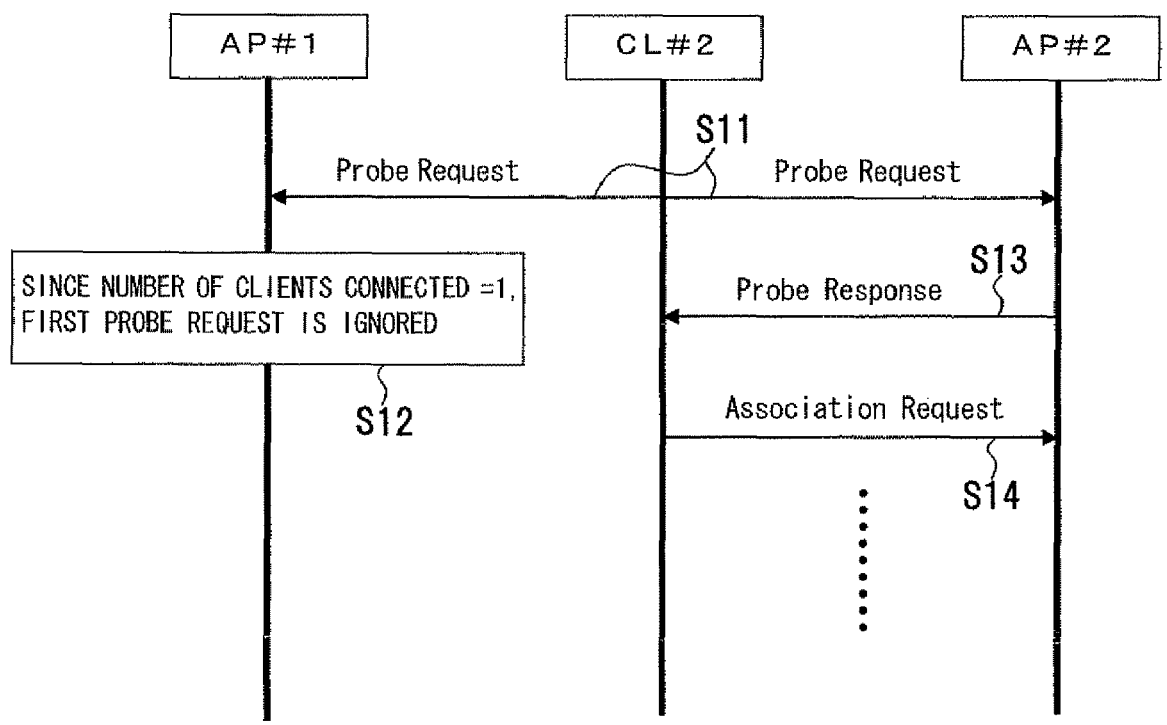
FIG. 8 is a diagram of an operation sequence of the client and the access points.

Description will then be made of an example of operation of the wireless LAN system 2, with reference to FIGS. 7 and 8. FIG. 7 is a diagram of the operation when a client is connected to the access point AP#1 and no client is connected to the access point AP#2 and FIG. 8 is a diagram of an operation sequence in such a case.

As shown in FIG. 7, when a client CL#1 is wireless-connected to the access point AP#1 and no client is connected to the access point AP#2, the connection request is sent from the client CL#2 to the access points AP#1 and AP#2.

In this case, as shown in FIG. 8, the connection request (Probe Request) is sent from the client CL#2 to the access points AP#1 and AP#2 (step S11). At the access point AP#1, since the client CL#1 is connected thereto and the number of clients connected=1, the first connection request is ignored (step S12). On the other hand, at the access point AP#2, since no client is connected thereto and the number of clients connected=0, the first connection request is accepted and the connection response (Probe Response) is sent (step S13). In response to this connection response, an association request is sent from the client CL#2 (step S14).

By this, the client CL#2 comes to be connected to the access point AP#2. The client CL#2 is connected to the access point AP#2 that has no client connection, namely, that has small load and as a result, dispersion of load is achieved.

Figure 9:
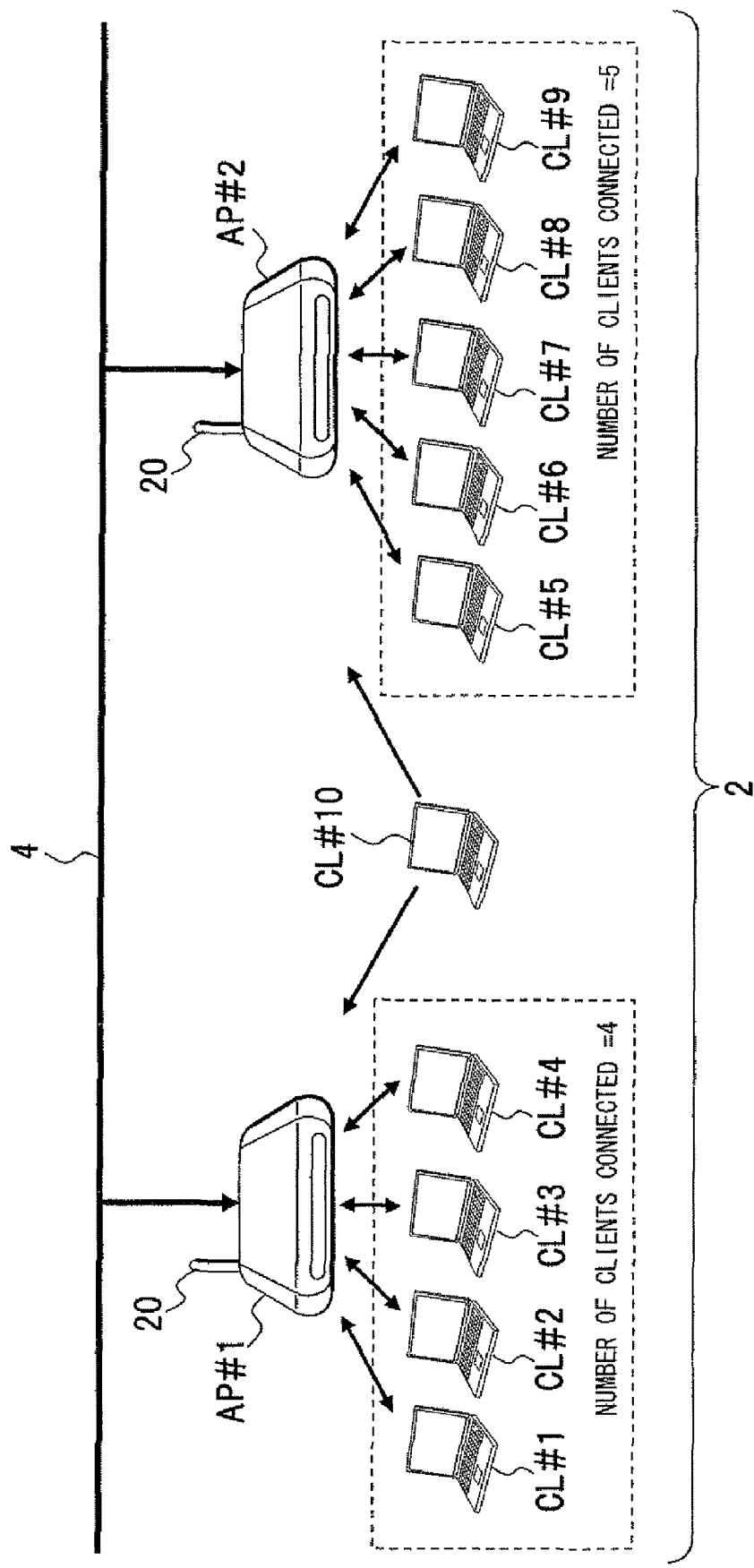
FIG. 9 is a diagram of the connection request from the client to the access points having different loads.
Figure 10:
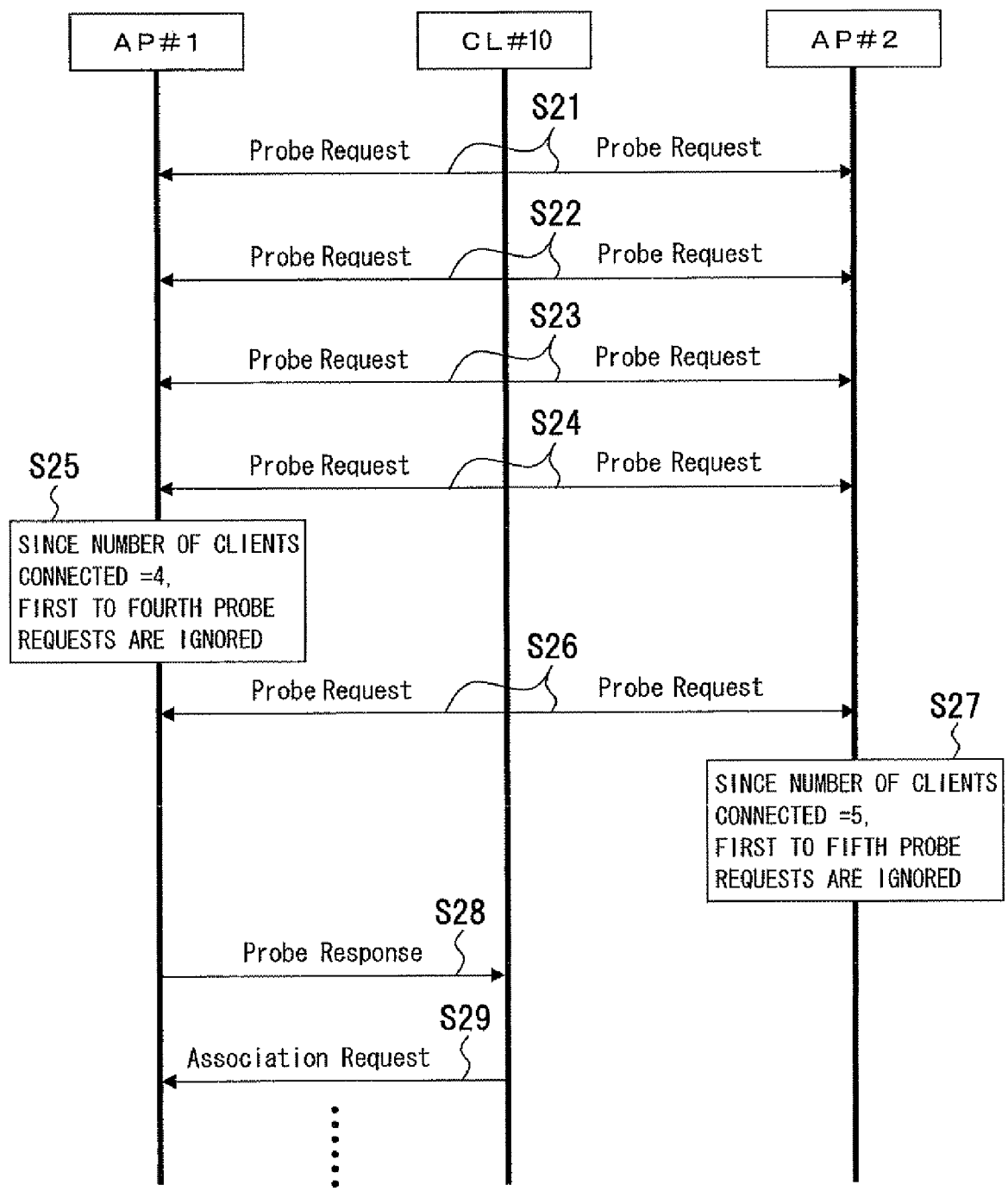
FIG. 10 is a diagram of the operation sequence of the client and the access points.

Description will then be made of another example of operation of the wireless LAN system 2, with reference to FIGS. 9 and 10. FIG. 9 is a diagram of the operation when the number of clients connected differs between the access points AP#1 and AP#2 and FIG. 10 is a diagram of an operation sequence in such a case.

As shown in FIG. 9, the clients CL#1, CL#2, CL#3, and CL#4 are wireless-connected to the access point AP#1 and the clients CL#5, CL#6, CL#7, CL#8, and CL#9 are wireless-connected to the access point AP#2. The connection request is sent from the client CL#10 to the access points AP#1 and AP#2.

In this case, as shown in FIG. 10, the connection request (Probe Request) is successively sent from the client CL#10 to the access points AP#1 and AP#2 (steps S21, S22, S23, and S24). At the access point AP#1, since the clients CL#1, CL#2, CL#3, and CL#4 are wireless-connected thereto and the number of clients connected=4, the connection request is ignored four times (step S25). Then, the fifth connection request (Probe Request) is sent from the client CL#10 to the access points AP#1 and AP#2 (step S26), At the access point AP#2, since the clients CL#5, CL#6, CL#7, CL#8, and CL#9 are wireless-connected thereto and the number of clients connected=5, the fifth connection request is also ignored (step S27).

On the other hand, to the fifth connection request from the client CL#10, the connection response (Probe Response) is sent from the access point AP#1 (step S28), and upon receipt of this connection response, the client CL#10 sends the association request to the access point AP#1 that has sent the connection response (step S29). The client CL#10 that sends this association request stops sending the connection request. The client CL#10 comes to be connected to the access point AP#1.

As seen above, since, to the connection request, the connection response is sent from the access point at the response timing depending on the number of clients, the client CL#10 is connected to the access point AP#1 that has small load and as a result, the dispersion of load between the access points AP#1 and AP#2 is achieved.

Figure 11:
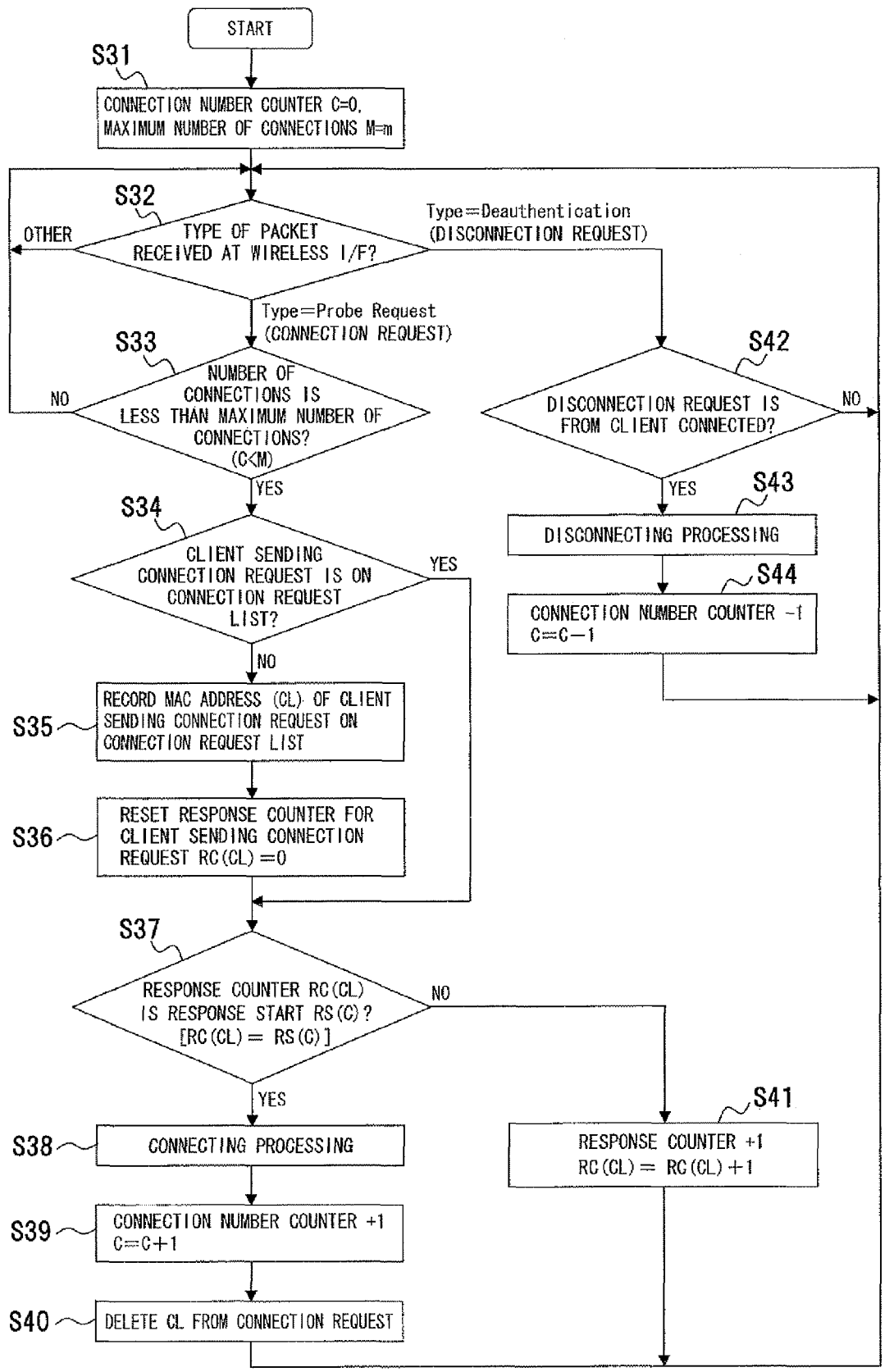
FIG. 11 is a flow chart of a processing procedure of a load dispersing program of the access points.

Description will be made of a processing procedure of a load dispersing program for realizing such a load dispersing method, with reference to FIG. 11. FIG. 11 is a flow chart of an example of the processing procedure of the load dispersing program.

The count number (number of connections) C=0 of the connection number counter 34 and maximum number of connections M=m are set, in the initial state (step S31). At this state, packet communication is executed and which state of "connection request", "disconnection request" or "other" the packet is in is judged (step S32) and in the case of the "other" state, waiting is made at the step S32.

Upon receipt of the connection request, judgment is made of whether the current number of connections is less than the maximum number of connections (C<M) (step S33) and if the current number of connections has reached the maximum number of connections (C=M), then the procedure goes back to the step S32. If the current number of connections has not reached the maximum number of connections (C<M), then determination is made of whether the client that sent the connection request is included in the connection request list (step S34). If the client is not included in the connection request list, then a MAC (Medium Access Control) address (CL) of the client is recorded on the connection request list (step S35) and the count number of the response counter 36 for the client that sent the connection request is reset, namely, RC(CL)=0 is set (step S36).

After such processing at steps S35 and S36 or when, at step S34, the client is included in the connection request list, judgment is made of whether the RC(CL) of the response counter 36 is a response start RS(C), namely, whether the following equation applies (step S37):

$$RC(CL)=RS(C) \qquad (1)$$

and if the following equation applies:

$$RC(CL)=RS(C) \qquad (2)$$

then, connection processing is executed (step S38), the number of connections of the connection number counter 34 is incremented, in this case, the processing of C=C+1 is executed (step S39), the CL is deleted from the connection request list (step S40), and the process goes back to step S32. On the other hand, if, at step S37, RC(CL)=RS(C) does not apply, then the count number of response counter 36 is incremented (step S41), in this case, the following processing is executed:

$$RC(CL)=RC(CL)+1 \qquad (3)$$

and likewise, the process goes back to step S32.

At step S32, when the disconnection request is received, judgment is made of whether the disconnection request comes from the client connected (step S42) If the disconnection request is not from the client connected, then, with no processing executed, the process goes back to step S32. On the other hand, if the disconnection request is from the client connected, then the disconnecting processing is executed (step S43), the number of connections of the connection number counter 34 is decremented, namely, processing of C=C−1 is executed (step 44), and the flow goes back to step S32.

As seen above, since the response time differs depending on the number of clients connected, the client can be connected to the access point that has a smallest number of connections and the load dispersion can be performed on the part of the access points.

Figure 12:
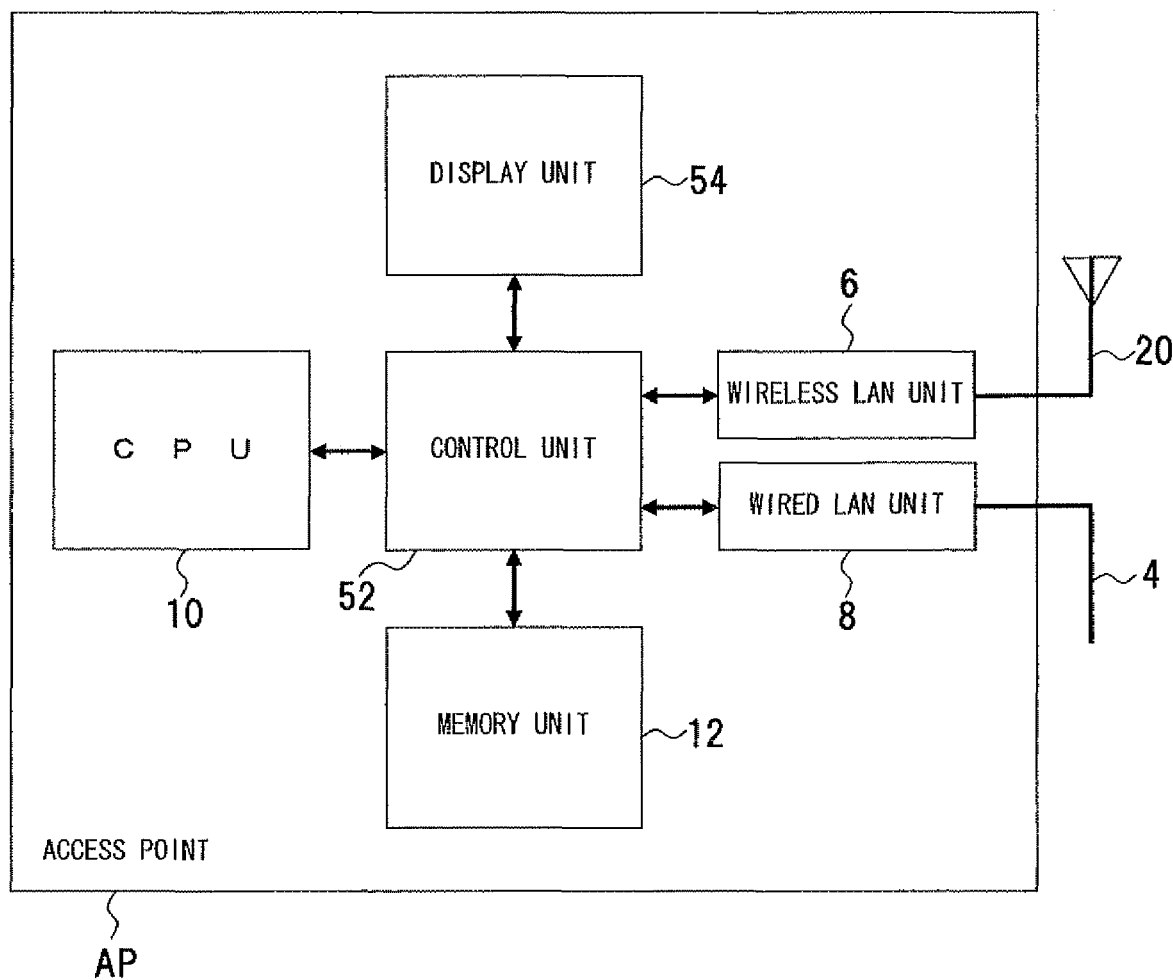
FIG. 12 is a diagram of another configuration example of the access point.
Figure 13:
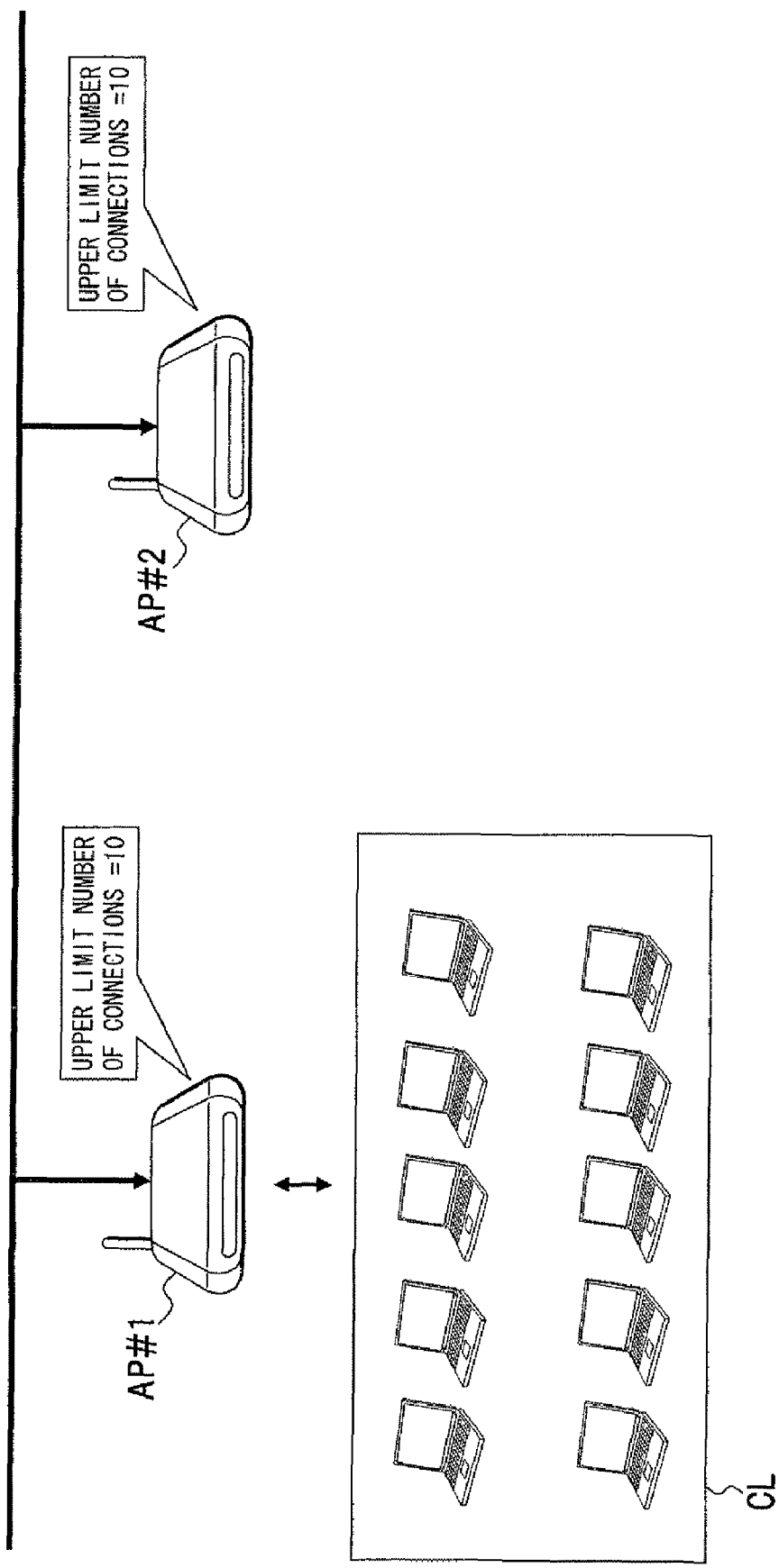
FIG. 13 is a diagram of uneven distribution of clients to a conventional access point.

Other Embodiments (1) With respect to the configuration of the access point AP, as shown in FIG. 12, the access point may be configured to have a control unit 52 between the CPU 10 and the wireless LAN unit 6 and the wired LAN unit 8 and have a display unit 54 comprising a display lamp, etc., connected to the control unit 52. In such configuration, the control unit 52 controls the number of clients connected and, to a new connection request received by the wireless LAN unit 6, can send a response at different response timing depending on the number of clients connected. The response and the state of connection with the clients can be displayed at the display unit 54. In FIG. 12, the same parts as in FIGS. 1 and 2 are given the same reference numerals, omitting description thereof.

(2) With respect to the timing of the response sent from the access point AP, while the above embodiments set RS(C)=C (the number of times of ignoring the Probe Request=the number of clients connected), the timing of the response to the connection request is not required to be proportional to the number of clients, but the response timing corresponding to the load of the access points can achieve the dispersion of the load. Namely, if the load of the access points AP#1 and AP#2 is given as C1 and C2, respectively and the magnitude relation of these loads C1 and C2 is as follows:

$$C1<C2 \qquad (4)$$

then, it will suffice if the following relationship is applicable and the present invention is not limited to the processing according to the above embodiments;

$$RS(C1) \leqq RS(C2) \qquad (5)$$

(3) With respect to the response time until the sending of the response from the access point AP based on the connection request, while the response time was caused to vary depending on the number of times of ignoring the Probe Request corresponding to the number of the clients, it may be so arranged that the timing itself of the response to the Probe Request is varied. While the IEEE (Institute of Electrical and Electronics Engineers) 802.11 specifies that the timing of the response to the Probe Request shall be SIFS (Short Inter Frame Space), it may be so arranged that the space is set so as to exceed the SIFS.

(4) With respect to the clients, while terminal devices such as personal computers are exemplified in the above embodiments, it may be so arranged that the clients are composed of electronic devices equipped with communication capability such as PDAs (Personal Digital Assistants) and game machines that make up the wireless LAN through access points APs.

While, in the above, description has been made of the most preferred embodiments, etc., of the present invention, the present invention shall not be limited to the above description, but of course various alterations and changes can be made to the present invention by persons skilled in the art based on the intent of the invention described in the scope of claims or disclosed in the specification and it goes without saying that such alterations and changes are included in the scope of the present invention.

As seen above, the present invention relates to the wireless communication apparatus to which a plurality of clients are connected by wireless and, since wireless communication apparatuses respond to the connection request from the client at different response timing depending on the number of clients connected, the present invention can achieve, and is useful for, the dispersion of load on the part of wireless communication apparatuses, without installing special facilities for the purpose of the load dispersion.

What is claimed is:

1. A wireless communication apparatus connected by wireless to a plurality of clients, the wireless communication apparatus comprising:
   a responding unit that responds to a connection request from a client at different response timing depending on the number of clients connected thereto, wherein
   the response timing is timing when the number of times of the connection request from the client exceeds the number of the clients connected.

2. The wireless communication apparatus of claim 1, wherein
   the responding unit generates a response time having duration corresponding to the number of the clients connected and responds after the response time.

3. The wireless communication apparatus of claim 1, wherein
   the responding unit ignores the connection request from the client by the number of times equal to the number of the clients connected and sends out a response to accept the connection request in case that the number of times of the connection request from the client has exceeded the number of the clients connected.

4. The wireless communication apparatus of claim 1, wherein the client is a terminal device connected to the wireless communication apparatus.

5. A load dispersing method of a wireless communication apparatus connected by wireless to a plurality of clients, the load dispersing method comprising:
   receiving a connection request from a client; and
   responding to the connection request at different response timing depending on the number of clients connected, wherein
   the response timing is timing when the number of times of the connection request from the client exceeds the number of the clients connected.

6. The load dispersing method of a wireless communication apparatus of claim 5 comprising:
   ignoring the connection request from the client by the number of times equal to the number of the clients connected and sending out a response to accept the connection request in case that the number of times of the connection request from the client has exceeded the number of the clients connected.

7. A load dispersing program to be executed by a computer for dispersing the load of wireless communication apparatuses to which a plurality of clients are connected by wireless, the program causing the computer to perform a method, the method comprising:
   receiving a connection request from a client; and
   responding to the connection request at different response timing depending on the number of clients connected, wherein
   the response timing is timing when the number of times of the connection request from the client exceeds the number of the clients connected.

8. The load dispersing program of wireless communication apparatuses of claim 7, the method comprising:
   ignoring the connection request from the client by the number of times equal to the number of the clients connected and sending out a response to accept the connection request in case that the number of times of the connection request from the client has exceeded the number of the clients connected.

9. A wireless communication system including a wireless communication apparatus connected by wireless to a plurality of clients, wherein
   the wireless communication apparatus receives a connection request sent out from a client, the wireless communication apparatus comprising a responding unit that responds to the connection request at different response timing depending on the number of clients connected thereto, wherein
   the response timing is timing when the number of times of the connection request from the client exceeds the number of the clients connected.

10. The wireless communication system of claim 9, wherein
    the responding unit generates a response time having duration corresponding to the number of the clients connected and responds after the response time.

11. The wireless communication system of claim 9, wherein
    the responding unit ignores the connection request from the client by the number of times equal to the number of the clients connected and sends out a response to accept the connection request in case that the number of times of the connection request from the client has exceeded the number of the clients connected.

12. The wireless communication system of claim 9, wherein the client is a terminal device connected to the wireless communication apparatus.

13. The wireless communication system of claim 9, wherein the wireless communication apparatus is an access point to which the client is connected by wireless.

14. A non-transitory computer-readable recording medium having thereon stored a load dispersing program to be executed by a computer for dispersing the load of wireless communication apparatuses to which a plurality of clients are connected by wireless, the program causing the computer to perform a method, the method comprising:
   receiving a connection request from a client; and
   responding to the connection request at different response timing depending on the number of clients connected, wherein
   the response timing is timing when the number of times of the connection request from the client exceeds the number of the clients connected.

15. The non-transitory computer-readable recording medium having thereon stored a load dispersing program of a wireless communication apparatus of claim 14, the method comprising:
   ignoring the connection request from the client by the number of times equal to the number of the clients connected and sending out a response to accept the connection request in case that the number of times of the connection request from the client has exceeded the number of the clients connected.

16. A load dispersing method of a wireless communication apparatus connected by wireless to a plurality of clients, the load dispersing method comprising:
   receiving a connection request from a client; and
   responding to the connection request at different response timing depending on the number of clients connected, wherein
   said responding includes generating a response time having duration corresponding to the number of the clients connected and responding after the response time.

17. A non-transitory computer-readable recording medium having thereon stored a load dispersing program to be executed by a computer for dispersing the load of a wireless communication apparatus to which a plurality of clients are connected by wireless, the program causing the computer to perform a method, the method comprising:
   receiving a connection request from a client; and
   responding to the connection request at different response timing depending on the number of clients connected,
   wherein said responding includes generating a response time having duration corresponding to the number of the clients connected and responding after the response time.

* * * * *